May 11, 1926.
V. SUSSIN
1,584,486
PIPE CONNECTION FOR AUTOMOBILE HEATERS
Filed Sept. 29, 1924  2 Sheets-Sheet 1
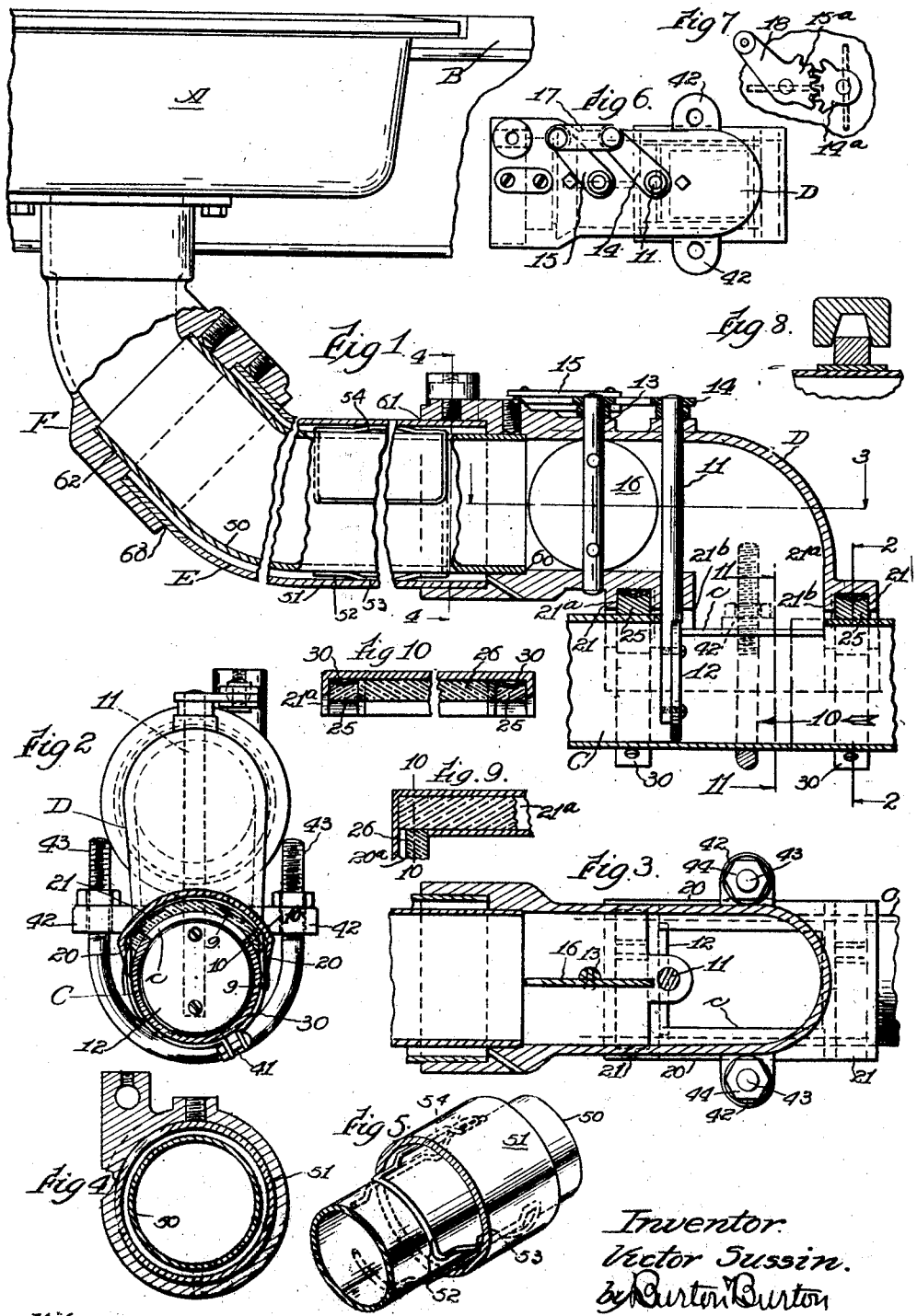
Inventor.
Victor Sussin.
by Burton Burton
his Attorneys.

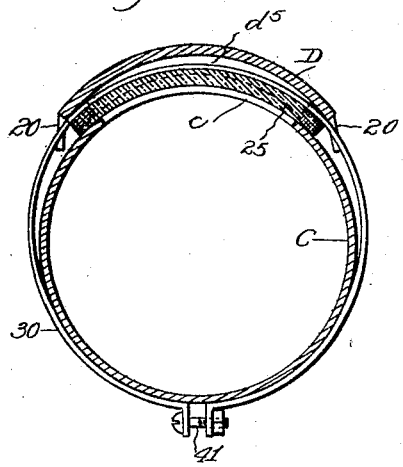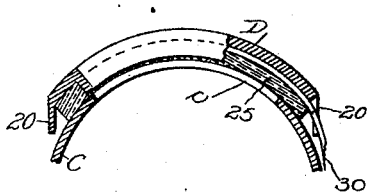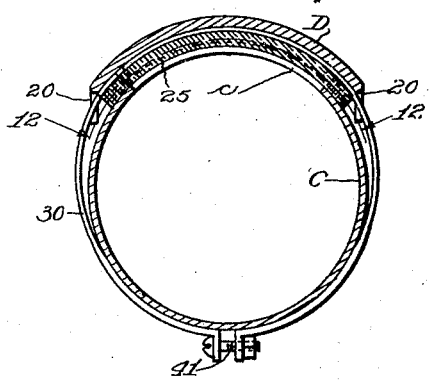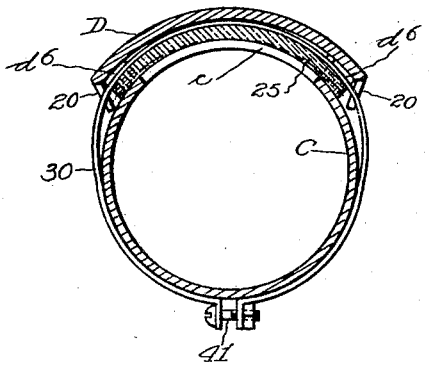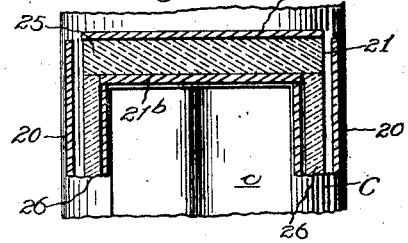

Patented May 11, 1926.

1,584,486

UNITED STATES PATENT OFFICE.

VICTOR SUSSIN, OF CHICAGO, ILLINOIS, ASSIGNOR TO STEWART-WARNER SPEED-OMETER CORPORATION, OF CHICAGO, ILLINOIS, A CORPORATION OF VIRGINIA.

PIPE CONNECTION FOR AUTOMOBILE HEATERS.

Application filed September 29, 1924. Serial No. 740,438.

The purpose of this invention is to provide an improved construction for coupling to a pipe conveying a heating fluid to a branch pipe for leading to a heater, particularly adapted for connecting an automobile heater with the exhaust pipe of the engine. It consists in the elements and features of construction shown and described as indicated in the claims.

In the drawings:

Figure 1 is a vertically sectional side elevation showing conventionally a heater mounted in the floor of a car body with the connecting branch pipe from the exhaust pipe leading to the heater, the pipe connections being shown in section longitudinally and axial with respect to the pipe elements.

Figure 2 is a section at the line, 2—2, on Fig. 1.

Figure 3 is a section at the line, 3—3, on Fig. 1.

Figure 4 is a section at the line, 4—4, on Fig. 1.

Figure 5 is a perspective view of a fragment of the conduit for the heating fluid leading to the heater.

Figure 6 is a detail top plan showing the valve operating connections.

Figure 7 is a view looking in the same direction as Figure 6 showing a modified operating connection between the valves.

Figure 8 is a detail section in the same plane as Figure 1 showing a modified form of the packing and seat for the same at the junction of the branch connecting fitting with the exhaust pipe.

Figure 9 is a detail section at the line, 9—9, on Figure 2.

Figure 10 is a detail section at the line, 10—10, on Figure 2 and on Figure 9.

Figure 11 is a section at the line, 11—11, on Figure 1.

Figure 12 is a section at the curved line, 12—12, on Figure 11, looked at in plan view.

Figure 13 is a detail section of the exhaust pipe and saddle at such a plane as 2—2 on Fig. 1 when the pipe is of the average size corresponding substantially to the curve of the saddle flange of the branch fitting.

Figure 14 is a view similar to Fig. 13, showing the pipe of over size in comparison with the fitting.

Figure 15 is a similar view showing the pipe of undersize in comparison with the fitting.

In the structure shown in the drawings, A represents the heater mounted in the floor of the car as indicated at B. C is the exhaust pipe from the engine. D is a fitting for connecting the exhaust pipe with the branch pipe leading to the heater, A, said fitting being in elbow form and the branch pipe being indicated at E, comprising a horizontal portion with an upward, forwardly trending bend for connecting with the fitting, F, attached to the heater.

The arrow, 10, on Fig. 4 indicates the direction of flow of the exhaust gases from the engine. The exhaust pipe has a longitudinally extending aperture, c, at which the elbow fitting, D, is connected. Mounted in the fitting, D, extending transversely of its horizontal extent and of the exhaust pipe is a stem, 11, for a butterfly valve, 12, positioned in the exhaust pipe at the rear end of the aperture, c, that is, in a position when closed to divert the heated gases out of the exhaust pipe, C, through the aperture, c, of the exhaust pipe, by way of the elbow fitting, D, into the branch pipe, E, leading to the heater. In the horizontal limb of the elbow fitting, D, there is mounted a second valve, 16, whose stem 13, is parallel to the stem, 11, the two stems protruding at the upper side of the elbow fitting, and being connected for concurrent and corresponding operation either as shown in Fig. 5 by lever arms, 14 and 15, on the stems, 11 and 13, respectively connected by a link, 17, or as shown in Fig. 7, by intermeshing segment gears, 14ᵃ and 15ᵃ, one of which has a lever arm as 18, which may be connected for operation of the valves in any desired manner, as may be done in the form shown in Figure 5 by any convenient connection with either of the lever arms, 14, or 15.

The present invention is concerned chiefly with providing a gas-tight mounting for the elbow fitting, D, upon the exhaust pipe and for insulating the branch pipe, E, throughout its length between the fittings at its ends, so as to prevent undue radiation of heat from this pipe antecedent to its connection to the heater. For the first mentioned purpose the elbow fitting, D, is provided at the open end at which it seats on the exhaust pipe and registers with the aperture, c, thereof, with a flange projecting outwardly with respect to the open end of the elbow which registers with the aperture, c, this flange comprising portions, 20, 20, which extend longitudinally of the exhaust pipe for overhanging the longitudinal margins of the aperture, c, and transverse portions, 21, 21, extending circumferentially with respect to the exhaust pipe, C, for overhanging the end margins of the aperture, c. These transverse portions, 21, 21, are recessed in their concave side toward the pipe, C, rendering them channel formed, the channels 21$^a$, serving to seat packing elements, 25, 25, which are lodged therein, co-operating packing elements, 26, 26, being lodged under the longitudinal flanges, 20, 20, in channel recesses 20$^a$ which may, though not necessarily, be provided, in said longitudinal flanges, the inner lips 21$^b$, of the circumferentially extending channel recesses, 21, being cut away at the intersection or meeting therewith of the longitudinal channels, so that the packing strips, 26, 26, lodged in the latter may have their ends abutting against the sides of the circumferentially positioned packing strips, 25. The channels which form the circumferentially extending recessed seats for the packing strips, 25, are of considerable depth and the packing strips, 25, being in width such as to be fitted easily into the channels, have thickness somewhat greater than the depth of the channels. The purpose of this channel- or recessed formation of the circumferentially extending packing seats and the dimensioning of the packing strips, 25, as mentioned, is to adapt the fitting, D, which has by virtue of these flanges a saddle-like formation at its open end at which it is joined to the exhaust pipe, C, to be by this means adapted to make a tight junction with exhaust pipes varying in diameter through a very considerable range. This function or adaptability is obtained by virtue of the fact that the packing strips, 25, being flexible, may be seated at their inner circumference on the exhaust pipe whatever its diameter, and may be seated in their channel seats laterally against the flanges or lips of these channels, the depth to which the packing extends in the channels or the distance to which the flanges or lips of the channels may extend down along the sides of the packing being immaterial, provided the packing is seated gas-tight on the flanges; which will be effected by any compression to which the packing may be subjected in clamping the elbow fitting onto the exhaust pipe; and which may be very desirably effected by means of a special clamping device which is shown in the drawings for clamping the packing members, 25, onto the exhaust pipe independently of the clamping of the elbow fitting onto said pipe. This preferred expedient consists of a strap, 30, of width not greater than that of the packing strips and which therefore will easily enter the channels. These straps are designed to be applied about the packing strips, 25, after the latter are properly positioned on the exhaust pipe, and before the elbow fitting is applied thereto, and to be connected and tightened slightly on the pipe by the bolts, 41, connecting their ends at the side of the pipe opposite the aperture, c; and when the elbow fitting has been put in position with the packing strips entered into the channel seats, the straps, 41, may be further tightened so as to expand the packing in the channels until it is seated tightly against the opposite walls thereof. For insuring this lateral expansion by the transverse tightening of the straps, 41, the latter are preferably formed at the portion which bears on the packing strips so as to be V-shaped in cross section with the apex inward with respect to the pipe, as seen in Fig. 4. The elbow fitting, D, is provided at its opposite sides with lugs, 42, for receiving the ends of a U-bolt, 43, which is applied from below around the exhaust pipe, C, and tightened by nuts, 44, for clamping the fitting, D, firmly onto the exhaust pipe. In view of this clamping of the fitting by the U-bolts, the straps, 40, for compressing and expanding the packing in the channels may be dispensed with, and the same function performed by making the channels tapering in cross-section, narrowing from the open mouth of the channel to the bottom, as seen in Figure 8, so that the action of clamping the fitting into the exhaust pipe by the U-bolts will cause the packing to be jammed tightly between the sloping walls of the channels with the same effect as if it were expanded as by the V-shaped clamping straps, 30.

Figures 13, 14 and 15, illustrate the range of adaptation of the fitting, D, to different sizes of pipes which is obtained by the expedient of the recessed channel seats for the circumferential packing members. Figure 11 shows the fitting, D, applied to an exhaust pipe of average diameter corresponding accurately with the form of the saddle terminal of the fitting. Figure 12 shows the same sized saddle applied to a pipe of approximately the largest size which can be accommodated by the saddle. Figure 13 shows it applied to a pipe of approximately the smallest size which can be accommodated. It will be observed that while in case of a medium or average sized pipe, as shown in Figure 11, the packing strips occupy the channel to the bottom and protrude uniformly throughout their entire extent, and that in the case of the largest sized pipe which can be accommodated, the strips occupy the channel to the bottom only toward the ends, channel lips lapping most fully on and embracing the packing at the ends, the lap diminishing and the protrusion of the packing increasing from the ends to the middle portion, as may be understood from the vacancy indicated at $d^5$ on Fig. 14, whereas, in the case of the smallest sized pipe which can be accommodated by the selected size of fitting or saddle flange thereof, the packing is most deeply seated in the channel occupying it to the bottom only at the middle of the circumferential extent and is entered least deeply at the ends, protruding nearly its entire width at the end portions, as may be understood from the vacancy indicated at $d^6$ on Fig. 15, the protrusion diminishing from the ends to the middle. But in all cases and throughout the entire range, the seating of the packing against the flanges is effectively gas-tight since even slight compression transversely of the pipe will expand it laterally for adequately firm seating against the flanges or lips of the channel seats.

The proximate ends of the elbow fitting, D, and the fitting, F, at the heater are similarly counter-bored, as seen at 60, 61, with respect to the fitting, D, and at 62, 63, with respect to the fitting, E, to form seats for the ends of two pipes of lesser and greater diameter adapted to be held concentric by the two seats thus formed in the fittings with an intervening air space, the inner pipe, 50, of lesser diameter having substantially the inner diameter of the fittings, D and E, so that the gas current flowing between the two fittings,—that is, from the exhaust pipe to the heater is confined to the interior of this lesser pipe, 50. There is thus formed, as stated, between the two pipes, 50 and 51, an annular air space which serves for heat insulation, preventing or very greatly diminishing the loss of heat by radiation from the outer pipe, 51. Since the pipes, 50 and 51, are desirably of comparatively light metal and the longitudinal extent between the fittings, D and F, may be considerable; so that flexure of one pipe or the other which might easily occur as from heating and cooling, bringing them into contact, would tend to cause heating of the outer pipe by conduction from the inner one, there is desirably provided means for spacing the pipes apart which shall not constitute any substantial means of conduction of the heat from one pipe to the other, and this is accomplished by making such spacer of wire of less diameter than the width of the annular space, as shown at 52, the same being formed by bending to seat at arcuate parts, 53 and 54, on the inner pipe and to seat at longitudinally extending parts, 55 and 56, on the outer pipe. The particular form of bending this spacer is a matter of judgment or preference.

I claim:—

1. In combination with an exhaust pipe having a longitudinally extending aperture less than 180 degrees in circumferential extent, a coupling for a branch connection at said aperture consisting of a hollow fitting terminating at one end in a saddle-like flange structure of suitable extent longitudinally and circumferentially of the apertured pipe to overhang the end margins of said aperture, with means for closing and packing the junction of said pipe and saddle at the longitudinal margins of the aperture, said flange structure along its circumferential extent being recessed transversely of the pipe to provide packing seats; packing in said seats and means for expanding the packing laterally for seating it against the lateral walls of the recessed seats and simultaneously compressing it radially with respect to the pipe for tight seating on the latter.

2. In the construction defined in claim 1 foregoing, the means for expanding the packing laterally in the seat comprising a strap extending behind the packing in the recess of the seat and around the pipe, and means for tightening the strap about the pipe.

3. In the construction defined in claim 1, foregoing, the means for expanding the packing laterally in the recessed seat comprising a strap extending behind the packing in the recess of the seat and around the pipe comprising a transversely V-shaped portion protruding against the packing and means for tightening the strap around the pipe.

4. In combination with an exhaust pipe having a longitudinally extending aperture, a coupling for a branch connection at said aperture, consisting of a hollow fitting terminating at one end in a saddle-like flange structure of suitable extent longitudinally and circumferentially of the apertured pipe to overhang the margins of said aperture, with means for closing and packing the junction of said pipe and saddle at the longitudinal margins of the aperture, said flange structure along its extent circumferentially of the pipe being recessed transversely of the pipe to provide packing seats, packing in said seats and means for clamping the fitting onto the pipe for compressing the packing for seating it firmly on the pipe at the margins of the aperture and for seating the circumferentially-extending elements of the flange structure laterally against the opposite walls of the recesses.

In testimony whereof, I have hereunto set my hand at Chicago, Illinois, this 23d day of September, 1924.

VICTOR SUSSIN.